(12) United States Patent
Kim

(10) Patent No.: US 6,721,836 B2
(45) Date of Patent: Apr. 13, 2004

(54) BUS SYSTEM HAVING AN ADDRESS/CONTROL BUS AND A DATA BUS, AND A DATA TRANSFER METHOD THEREOF

(75) Inventor: Jin-soo Kim, Suwon (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 486 days.

(21) Appl. No.: 09/794,160

(22) Filed: Feb. 28, 2001

(65) Prior Publication Data

US 2002/0019900 A1 Feb. 14, 2002

(30) Foreign Application Priority Data

Jul. 27, 2000 (KR) .......................................... 2000-4334

(51) Int. Cl.[7] .............................................. G06F 13/20
(52) U.S. Cl. ...................................... 710/240; 370/912
(58) Field of Search ................................ 710/110, 107, 710/112, 113, 240, 241, 4, 305; 712/31; 711/151; 370/912, 462; 709/211, 107; 340/825.51

(56) References Cited

U.S. PATENT DOCUMENTS

| 4,818,985 | A | * | 4/1989 | Ikeda |
| 5,546,587 | A | * | 8/1996 | Silver |
| 5,995,513 | A | | 11/1999 | Harrand et al. |
| 6,081,860 | A | | 6/2000 | Bridges |

FOREIGN PATENT DOCUMENTS

| EP | 0 278 264 A2 | 8/1988 |
| EP | 0 737 924 A2 | 10/1996 |
| JP | 10-262070 | 9/1998 |
| JP | 2000-172553 | 6/2000 |
| WO | WO 00/29957 | 5/2000 |

OTHER PUBLICATIONS

Official Action of Japanese patent application No. 2001–140648 dated Dec. 2, 2003.

* cited by examiner

Primary Examiner—Gopal C. Ray
(74) Attorney, Agent, or Firm—Sughrue Mion, PLLC (57) ABSTRACT

A bus arbitration system and a data transfer arbitration method, comprising (a) receiving bus requests from two or more master devices and arbitrating access to an address/control bus according to a predetermined arbitration algorithm, (b) receiving an access command packet containing information for data transfer preparation from the master device through the address/control bus in the order determined as a result of the arbitration and transmitting the received access command packet to a corresponding slave device, (c) receiving notification of transfer preparation completion of corresponding data from the slave device, (d) informing the master device of the start of data transfer, and (e) transferring data through the data bus. The slave devices may be high-speed devices such as synchronous DRAM (SDRAM). Bus efficiency is improved, as separate master devices can simultaneously and separately control the address/control bus and the data bus.

17 Claims, 5 Drawing Sheets

ACCESS COMMAND PACKET

- ADDRESS
- READ/WRITE FLAG
- BURST LENGTH
- MASTER DEVICE IDENTIFIER
- BIT WIDTH

FIG. 4

TRANSFER CONTROL PACKET

- DATA TRANSFER START INDICATOR
- DATA TRANSFER FINISH INDICATOR
- ABORT INDICATOR
- DATA STALL INDICATOR
- IDENTIFIER OF MASTER DEVICE TO WHICH DATA TRANSFER START INDICATOR SHOULD BE TRANSFERRED
- IDENTIFIER OF MASTER DEVICE TO WHICH DATA TRANSFER FINISH INDICATOR SHOULD BE TRANSFERRED
- IDENTIFIER OF MASTER DEVICE TO WHICH ABORT INDICATOR SHOULD BE TRANSFERRED
- IDENTIFIER OF MASTER DEVICE TO WHICH DATA STALL INDICATOR SHOULD BE TRANSFERRED

FIG. 5

DATA TRANSFER PACKET

- DATA TRANSFER INDICATOR
- DATA STALL INDICATOR
- ABORT INDICATOR

BUS SYSTEM HAVING AN ADDRESS/CONTROL BUS AND A DATA BUS, AND A DATA TRANSFER METHOD THEREOF

BACKGROUND OF THE INVENTION

1. Field of the Invention

The present invention relates to a bus system and data transfer method therefor, and more particularly, to a bus system including an address/control bus and a data bus that connect a plurality of master devices to a plurality of slave devices, and data transfer method therefor. Korean Patent Application No. 00-43334, filed Jul. 27, 2000, is incorporated herein by reference.

2. Description of the Related Art

An arbiter is used to arbitrate access to a bus. In conventional bus systems, an arbiter receives requests for access to a bus from a plurality of master devices, arbitrates the bus access requests according to a specific arbitration algorithm, and grants control of the bus to the master devices based on the arbitration result. Once a master's request has been granted, the master may take control of the bus until the master has completed its transfer of data with a corresponding slave device. Here, the bus means both an address/control bus and a data bus. There is substantially no problem in a conventional arbitration system by an arbiter as long as slave devices access both the address/control bus and the data bus concurrently.

However, a currently used bus system adopts a high-speed memory such as synchronous DRAM (SDRAM) as a slave device. In the case of high-speed memory such as SDRAM, it does not access an access/control bus concurrently with a data bus. That is, if an address/control signal such as an address or read/write flag is input to SDRAM, data is output or input after a predetermined latency time has lapsed. Thus, a master device actually takes control of an address/control bus or a data bus for a shorter period than is expected. According to the conventional arbitration system in which access to or control of both address/control bus and data bus is granted simultaneously for a predetermined time, there are a large number of idle clock cycles of the address/control bus and/or data bus, which may degrade the efficiency of bus access.

SUMMARY OF THE INVENTION

To solve the above problems, it is an objective of the present invention to provide a bus system having a high speed slave device such as synchronous DRAM (SDRAM) for improving the efficiency of bus access, and a data transfer method therefor.

Accordingly, to achieve the above objectives, the present invention provides a data transfer arbitration method that includes the steps of (a) receiving bus requests from two or more master devices and arbitrating access to an address/control bus according to a predetermined arbitration algorithm, (b) receiving an access command packet containing information for data transfer preparation from the master device through the address/control bus in the order determined as a result of the arbitration and transmitting the received access command packet to a corresponding slave device, (c) receiving notification of transfer preparation completion of corresponding data from the slave device, (d) informing the master device of the start of data transfer, and (e) transferring data through the data bus.

The data transfer method further includes the steps of (f) receiving notification of data transfer completion from the slave device, and (g) informing the master device of data transfer completion.

Preferably, the step (c) includes the step of (c1) receiving a transfer control packet containing a data transfer start indicator and an identifier of a corresponding master device from the slave device, and the step (d) includes the step (d1) of informing the master device having the identifier of the data transfer start.

Preferably, the step (f) includes the step of (f1) receiving a transfer control packet containing a data transfer finish indicator and an identifier of a corresponding master device, and the step (g) includes the step of (g1) informing the master device having the identifier of the data transfer finish.

The access command packet includes an address, a read/write flag, a bit width, an identifier of a master device transmitting the access command packet, and a burst length for burst transmission of data.

If data transfer in the step (e) aborts, the data method includes the steps of (h) receiving the abort indicator from the slave device, (i) informing a corresponding master device of the abort of data transmission, and (j) retransmitting data.

Preferably, the step (h) includes the step of (h') receiving the abort indicator and an identifier of a corresponding master device from the slave device, and the step (i) includes the step of (i') transmitting the abort indicator to the master device having the identifier.

The present invention also provides a bus system including an address/control bus and a data bus. The bus system includes an arbiter for arbitrating access to the address/control bus according to a predetermined arbitration algorithm, one or more master devices which transmits an access command packet containing information for data transfer preparation through the address/control bus in the order determined as a result of the arbitration, and which receives or transmits data through the data bus upon receipt of a notice of data transfer start from the arbiter, and one or more slave devices which informs the arbiter of data transfer preparation completion by receiving and executing the access command packet, and which receives or transmits data through the data bus upon receipt of a notice of data transfer start to a corresponding master device from the arbiter.

Preferably, upon receipt of data transfer finish from the slave device, the arbiter informs the master device of the data transfer finish. The slave device transmits a transfer control packet containing a data transfer start indicator and an identifier of a corresponding device for informing about data transfer preparation completion, and the arbiter informs the master device, having the identifier contained in the transfer control packet, of the data transfer start.

Furthermore, the slave device transmits a transfer control packet containing a data transfer finish indicator and an identifier of a corresponding master device, if the data transfer is complete. The access command packet contains an address, a read/write flag, a bit width, an identifier of a master device transmitting the access command packet, and a burst length for burst transmission of data.

Preferably, if data transfer aborts, the slave device transmits a transfer control packet containing the abort indicator and an identifier of a corresponding master device to the arbiter, and the arbiter transmits the abort indicator to the master device having the identifier contained in the transfer control packet.

BRIEF DESCRIPTION OF THE DRAWINGS

The above objectives and advantages of the present invention will become more apparent by describing in detail a preferred embodiment thereof with reference to the attached drawings in which.

DETAILED DESCRIPTION OF THE INVENTION

Figure 1:
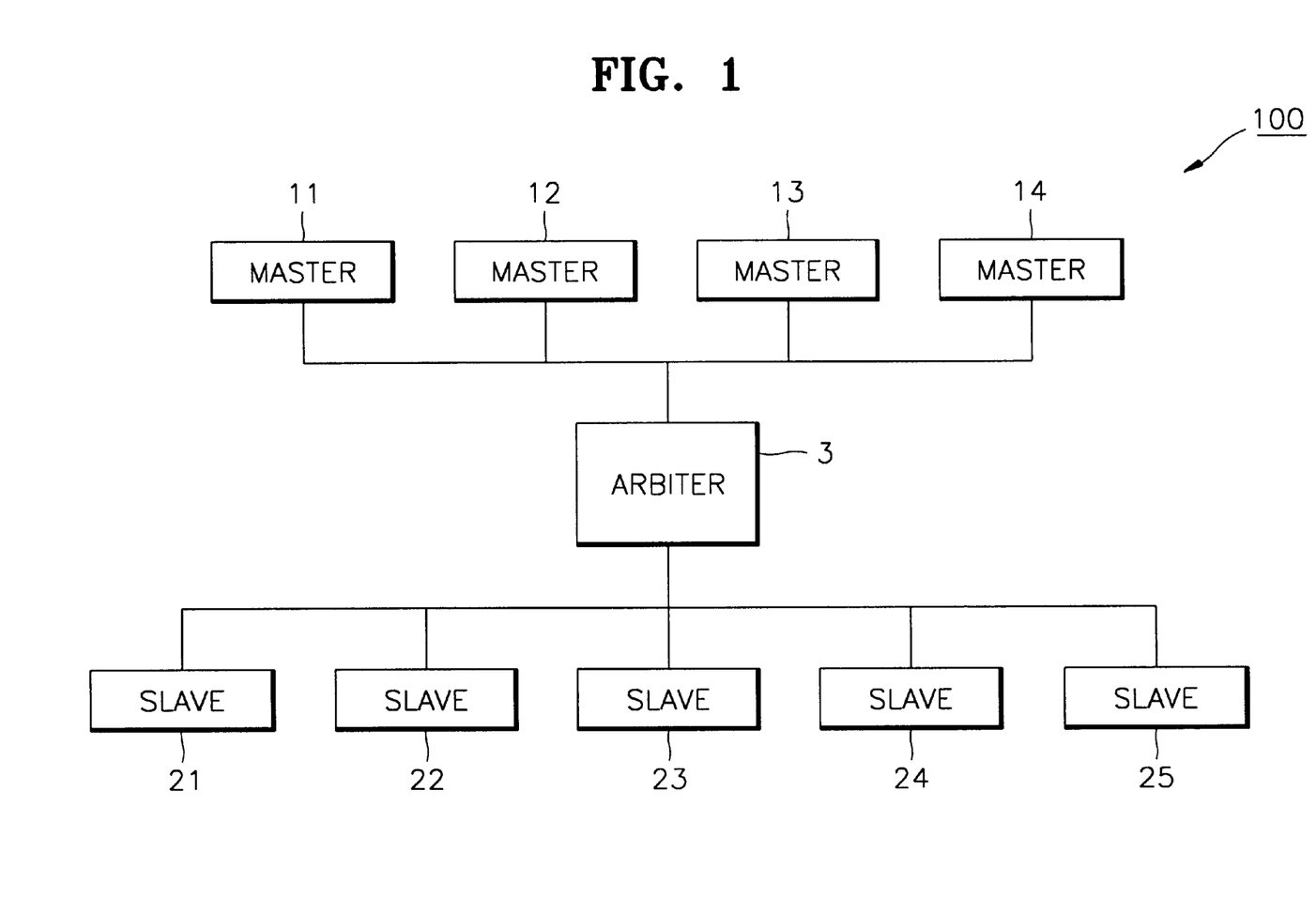
FIG. 1 is a schematic diagram showing a bus system according to a preferred embodiment.

Referring to FIG. 1, a bus system 100 includes a plurality of master devices 11–14, a plurality of slave devices 21–25, and an arbiter 3. The plurality of master devices 11–14 and the plurality of slave devices 21–25 are interconnected by a data bus which is not shown in detail for simplification. The data bus may include a main data bus and a local data bus which function at different transfer speeds.

The master devices 11–14 generally refer to a processor or a direct memory access (DMA) device, and the slave devices 21–25 refer to a memory such as a RAM or a ROM, an I/O device, or other peripheral devices. Each of the master devices 11–14 may become a slave device with regard to another master device 11–14. Furthermore, the number of master devices and slave devices may vary when necessary.

An arbiter in a conventional bus system grants control of an address/control bus to a master device, and allows the master device to directly control the slave device and handle a response from the slave device. However, the arbiter 3 according to the present invention does not grant control of an address/control bus to a master device. Rather than doing so, the arbiter 3 receives information (hereinafter referred to as "access command packet") necessary for data transfer, such as an address, a read/write flag, the size of burst data transmitted and a bit width output from the master devices 11–14, and then transmits the access command packets directly to the slave devices 21–25 and manages the slave devices 21–25.

Figure 2:
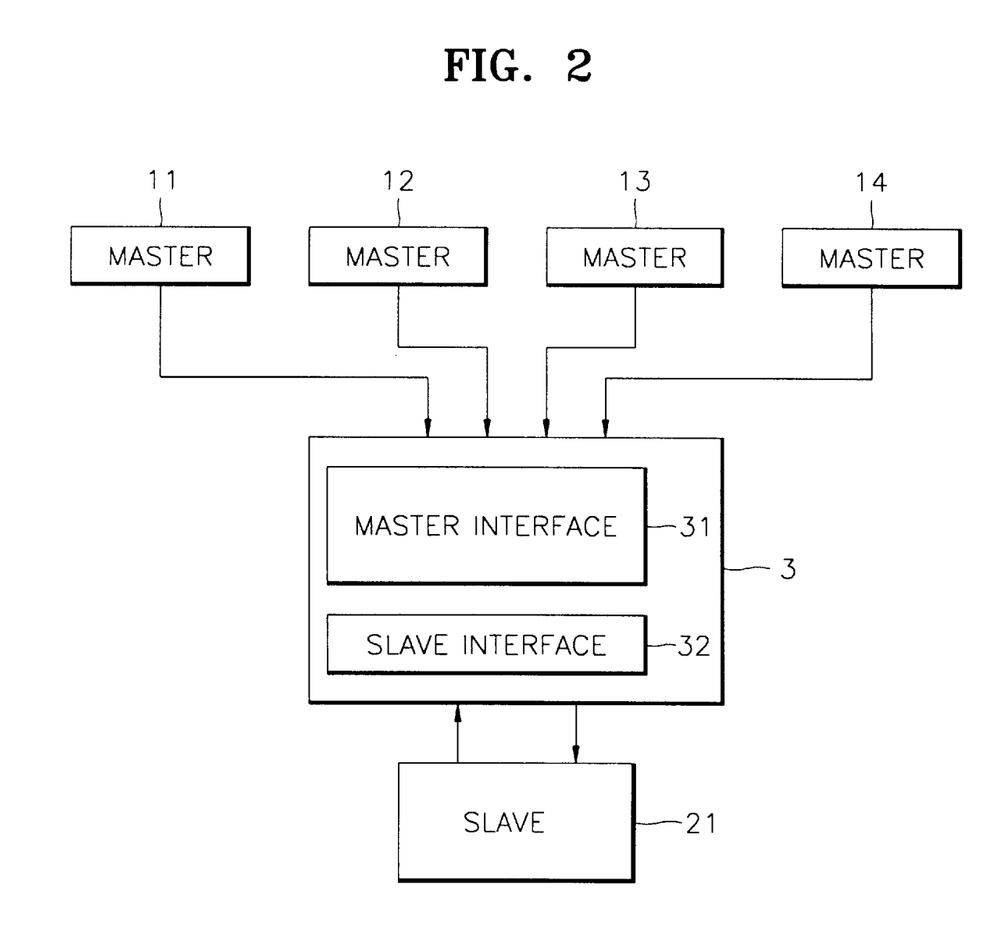
FIG. 2 is a detailed block diagram showing the arbiter of FIG. 1.

FIG. 2 is a detailed block diagram showing the arbiter 3 of FIG. 1. For a simplified description, it is assumed that a corresponding slave device denotes a slave device of reference numeral 21. Referring to FIG. 2, the arbiter 3 includes a master interface 31 and a slave interface 32. The master interface 31 receives an access command packet from a master device 11, 12, 13, or 14 and then transmits the access command packet to a corresponding slave device 21. The slave interface 32 receives notification of transfer preparation completion of corresponding data from the slave device 21 which has received the access command packet, and informs the corresponding master device 11, 12, 13, or 14 of the start of data transfer. Then, the corresponding data is transferred through the data bus provided in the bus system 100.

Specifically, the slave device 21, which has received the access command packet, completes the corresponding data transfer preparation, and outputs a transfer control packet for controlling data transfer to the slave interface 32 which in turn outputs a data transfer packet for data transfer to the corresponding master device 11, 12, 13, or 14.

Figure 3:
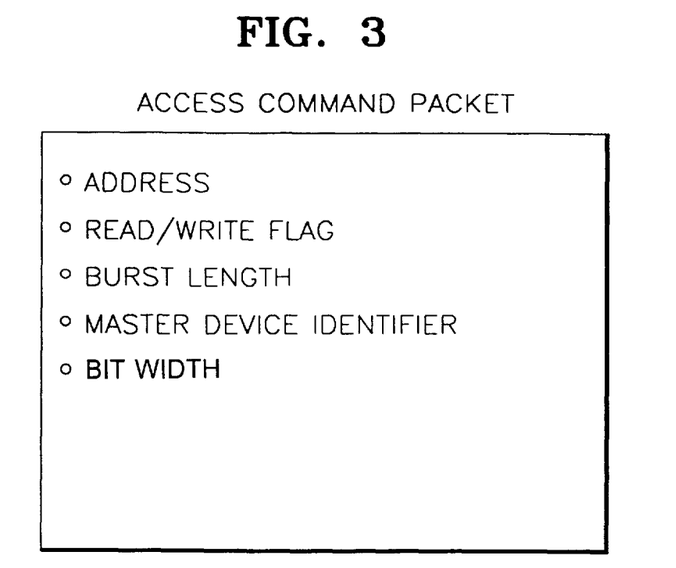
FIG. 3 is a reference diagram for explaining the construction of an access command packet according to a preferred embodiment of the present invention.

Referring to FIG. 3, an access command packet contains various control information necessary for reading or writing data, such as an address, a read/write flag, a bit width, a burst length, and an identifier of the corresponding master device 11, 12, 13, or 14. The address refers to the address of a point where an access starts for reading/writing necessary data from/to the corresponding slave device. The read/write flag serves as an indicator signaling the direction of data transfer. In the case of a read flag, data is read from the slave device 21, that is, data is transferred from the slave device 21 to the corresponding master device 11, 12, 13, or 14. In the case of write flag, data is written to the slave device 21, that is, data is transferred from the corresponding master device 11, 12, 13, or 14 to the slave device 21. The bit width refers to a data transfer width. Actually, since 32 bits of data is not necessarily transferred in a 32-bit memory bus system 32, for example, 8 bits or 16 bits of data may be transferred if necessary, the bit width of data to be transferred is required for data transfer preparation. The burst length means the length of data when burst transmission of data is made. The slave device can complete data transfer based on the burst length.

A memory device such as synchronous DRAM (SDRAM) is an example of a device supporting burst transmission. The slave device 21 identifies the master device 11, 12, 13, or 14, to which data should be transferred, through the identifier of the corresponding master device 11, 12, 13, or 14. In a conventional arbitration method, a master device directly controls a corresponding slave device, and thus the slave device does not need to identify which master device should receive data. Conversely, in the present invention employing an arbitration scheme in which the arbiter 3 directly controls the slave device 21, the slave device 21 needs to be informed of the master device to which data transfer is made.

Figure 4:
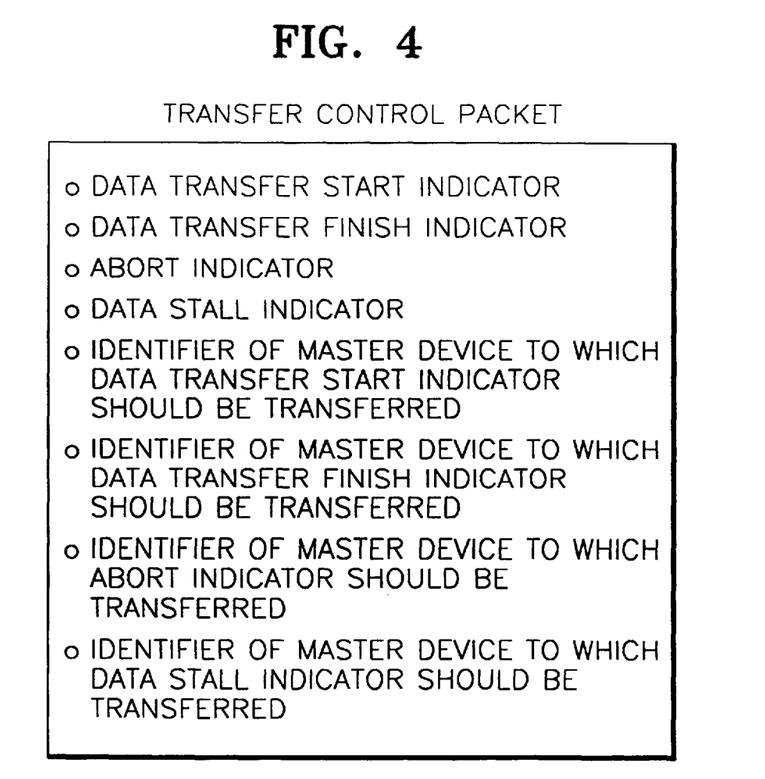
FIG. 4 is a reference diagram for explaining the construction of a transfer control packet according to a preferred embodiment of the present invention.

FIG. 4 is a reference diagram for explaining the construction of a transfer control packet according to a preferred embodiment of this invention. Referring to FIG. 4, the transfer control packet contains a data transfer start indicator, a data transfer finish indicator, an abort indicator, a data stall indicator, an identifier of a master device to which the data transfer start indicator should be transmitted, an identifier of a master device to which the data transfer finish indicator should be transmitted, an identifier of a master device to which the abort indicator should be transmitted, and an identifier of a master device to which the data stall indicator should be transmitted.

The data transfer start indicator indicates a point in time when data transfer starts through a data bus. The data transfer finish indicator indicates a point in time when data transfer has finished through the data bus. The abort indicator is transmitted when data transfer has not finished successfully for various reasons along with the identifier of a master device to which the abort indicator should be transferred. The data stall indicator indicates when data should be stalled or will be stalled during data transfer through the data bus for various reasons. The identifier of a master device to which the data transfer start indicator should be transmitted, the identifier of a master device to which the data transfer finish indicator should be transmitted, the identifier of a master device to which the abort indicator should be transferred, and the identifier of a master device to which the data stall indicator should be transmitted indicate master devices to which the corresponding signals should be transmitted.

Figure 5:
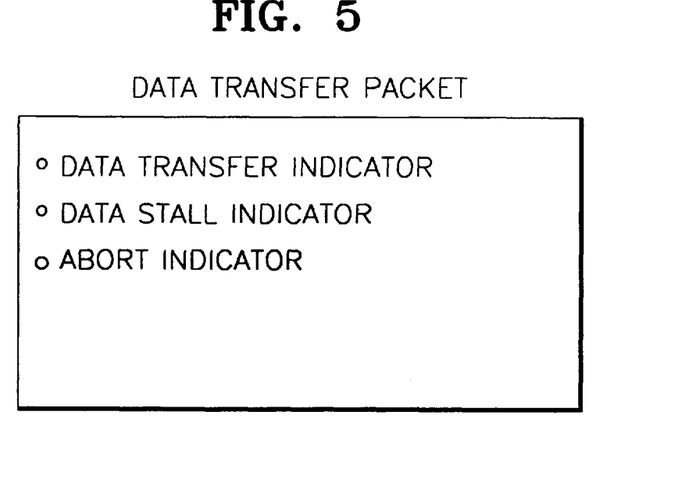
FIG. 5 is a reference diagram for explaining the construction of a data transfer packet.

FIG. 5 is a reference diagram for explaining the construction of a data transfer packet according to a preferred embodiment of this invention. Referring to FIG. 5, the data transfer packet contains a data transfer indicator, a data stall indicator, and an abort indicator. The data transfer indicator indicates that data is being transferred through a data bus. The active duration of this indicator is equal to the burst length contained in the access command packet if there is no data stall. For example, if the burst length is 10, the data transfer indicator is activated during 10 clock cycles. The data stall indicator indicates data stalls which may occur due to various causes. The abort indicator is transmitted when data transfer has not successfully finished for various causes.

Figure 6:
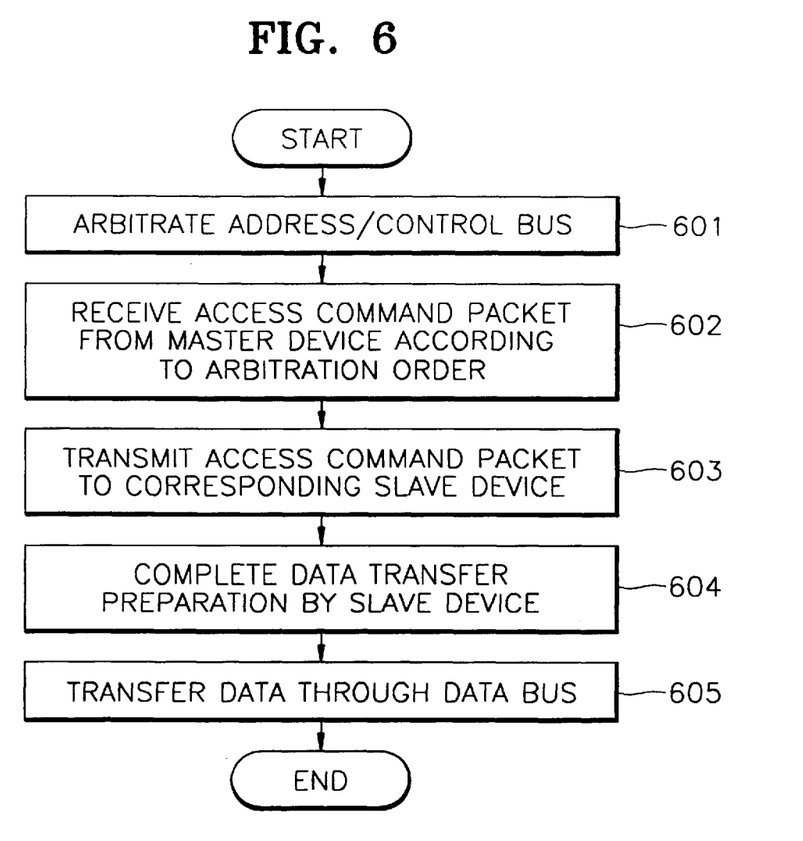
FIG. 6 is a schematic flowchart for explaining a data transfer method according to a preferred embodiment of the present invention.

Based on the above constructions, a data transfer method according to a preferred embodiment of the invention will now be described with reference to FIGS. 6 and 7. Referring to FIG. 6, the arbiter 3 receives address/control bus requests from two or more master devices 11–14, and arbitrates the address/control bus according to a predetermined arbitration algorithm (step 601). Here, arbitration of the address/control bus requests means determining the order of receiving access command packets. That is, since the arbiter 3 according to the present invention is disposed on the address/control bus that connects the master devices 11–14 to the slave devices 21–25, this arbitration is available if two or more master devices 11–14 transmit access command packets. Arbitration algorithms available include arbitration algorithms which will be known in the future as well as conventional algorithms known in the art. However, the arbitration algorithm itself departs from the gist of the invention, and thus a detailed description will be omitted.

The arbiter 3 receives an access command packet from the master device 11, 12, 13, or 14 through the address/control bus in the order according to the result of this arbitration (step 602). The received access command packet is then transmitted to the corresponding slave device 21 (step 603). The slave device 21 receives the received access command packet to complete transfer preparation of corresponding data (step 604). As data transfer preparation is complete, data transfer is made through a data bus that connects the master device 11, 12, 13, or 14 to the slave device 21 (step 605).

Figure 7:
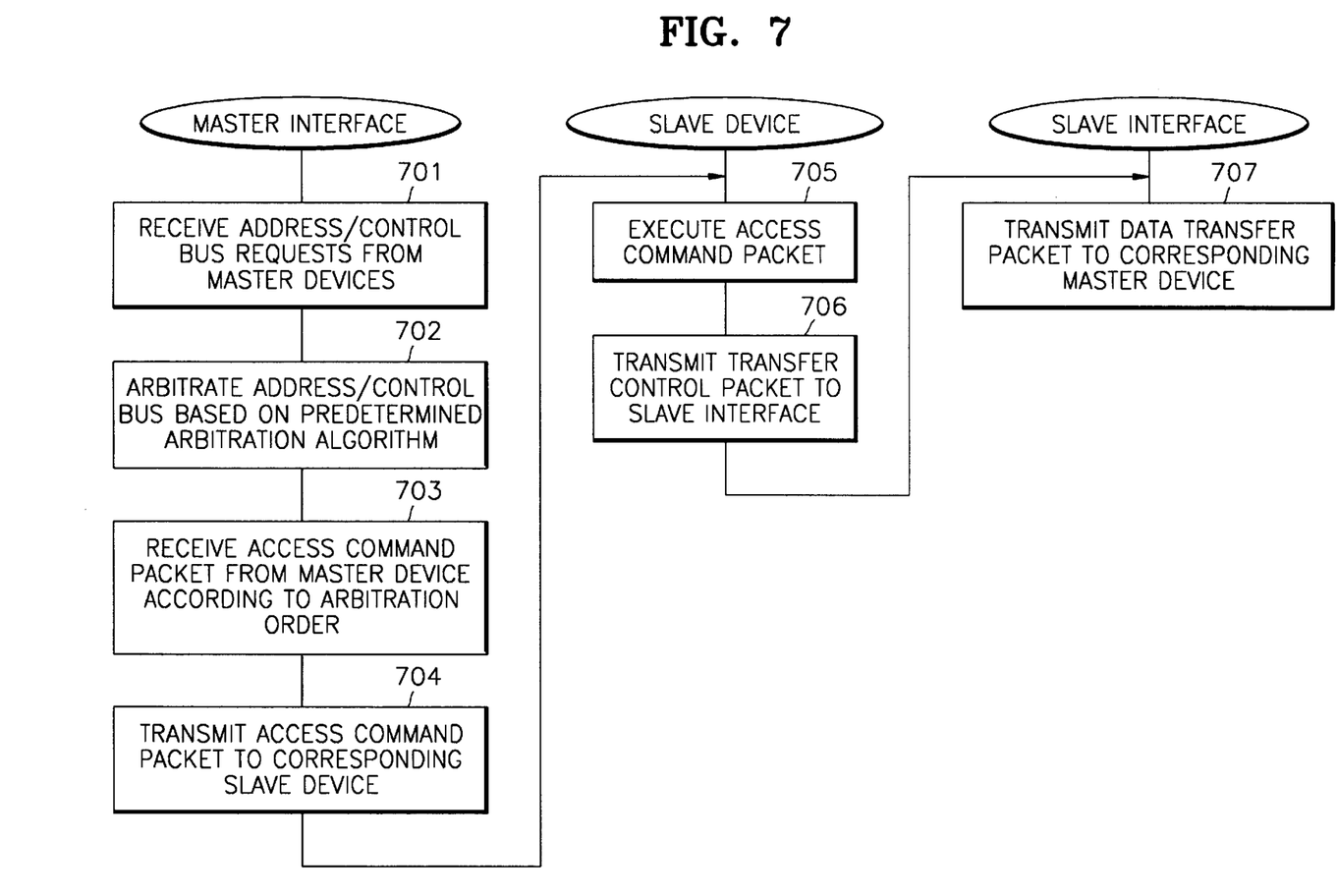
FIG. 7 is a detailed flowchart for explaining the data transfer method shown in FIG. 6.

FIG. 7 is a detailed flowchart for explaining the data transfer method of FIG. 6. Referring to FIG. 7, the following procedure is executed in the master interface 31. The master interface 31 receives address/control bus requests from the master devices 11–14 (step 701). If the address/control bus requests are received, access to the address/control bus is arbitrated based on a predetermined arbitration algorithm (step 702). Here, the arbitration has the same meaning as in the step 601. Next, an access command packet is received from the master device 11, 12, 13, or 14 in the order determined according to the arbitration in the step 702 (step 703). The received access command packet is transmitted to the corresponding slave device 21 (step 704).

The following procedure is executed in the slave device 21. The slave device executes the received access command packet (step 705). The slave device that completes data transfer preparation by executing the access command packet transmits a transfer control packet to the slave interface (step 706).

The following procedure is executed in the slave interface 32. The slave interface 32 transmits a data transfer packet to the master device 11, 12, 13, or 14 corresponding to a master device identifier contained in the received transfer control packet (step 707). At the same time that the data transfer packet is transmitted, data is transferred through a data bus, thereby completing execution of the access command packet output from the master device 11, 12, 13, or 14.

Although the data transfer method has been performed in the order of the master interface 31, the slave device 21, and the slave interface 32 in this embodiment, since the master interface 31 and the slave interface 32 are independent of each other, transmission of the access command packet, transfer control packet, and data transfer packet may be performed in a separate way. In other words, according to the present invention, a master device taking control of the address/control bus may be different from a master device taking control of the data bus at a particular moment.

Meanwhile, according to the control method according to the present invention, the transfer control packet contains the data stall indicator and abort indicator so as to prevent possible errors during transmission of the transfer control packet between the slave device 21 and the arbiter 3. Furthermore, the data transfer packet contains the data stall indicator and the abort indicator so as to prevent errors possible during transmission of the data transfer packet between the arbiter 3 and the master device 11, 12, 13, or 14. Accordingly, the present invention takes measures to cope with errors during data transfer, thereby offering a low error rate and high system performance.

As described above, the present invention provides a bus system for improving efficiency of bus access, a bus system that adopts a high-speed slave device such as SDRAM, and a data transfer method therefor. That is, separate master devices can take control of the address/control bus and the data bus at any particular time, thereby reducing idle clock cycles of the bus.

Along with this, after having transmitted access command packets to an arbiter, a master device promptly returns to its main job, thereby improving working efficiency. Furthermore, the master device can transfer another access command packet before data transfer starts, thereby allowing continuous data transfer and minimizing idle clock cycles of a data bus.

In addition, unlike a conventional bus system in which a master device directly controls slave devices, a master device according to the present invention is responsible for transmitting only access command packets and then waits until data transfer starts, thereby offering a significantly simplified bus interface architecture compared to the conventional bus system.

It is contemplated that numerous modifications may be made to the present invention without departing from the spirit and scope of the invention as defined in the following claims.

What is claimed is:

1. A data transfer method comprising the steps of:
   (a) receiving bus requests from two or more master devices and arbitrating access to an address/control bus according to a predetermined arbitration algorithm;
   (b) receiving, at an arbiter, an access command packet containing information for data transfer preparation from the master device through the address/control bus in the order determined as a result of the arbitration and transmitting the received access command packet to a corresponding slave device;
   (c) receiving notification of transfer preparation completion of corresponding data from the slave device;

(d) informing the master device of the start of data transfer; and (e) transferring data through the data bus.

2. The data transfer method of claim 1, further comprising, after the step (e), the steps of:

(f) receiving notification of data transfer completion from the slave device; and (g) informing the master device of the data transfer completion.

3. The data transfer method of claim 2, wherein, in the step(f), an arbiter receives notification of the data transfer completion from the slave device, and, in the step(g), the arbiter informs the master device of the data transfer completion.

4. A data transfer method comprising the steps of:

(a) receiving bus requests from two or more master devices and arbitrating access to an address/control bus according to a predetermined arbitration algorithm;

(b) receiving an access command packet containing information for data transfer preparation from the master device through the address/control bus in the order determined as a result of the arbitration and transmitting the received access command packet to a corresponding slave device;

(c) receiving notification of transfer preparation completion of corresponding data from the slave device, (d) informing the master device of the start of data transfer;

(e) transferring data through the data bus; and after the step (e), the data transfer method comprises steps of:

(f) receiving notification of data transfer completion from the slave device; and (g) informing the master device of the data transfer completion wherein:

the step (c) comprises the step of (c1) receiving a transfer control packet containing a data transfer start indicator and an identifier of a corresponding master device from the slave device, and the step (d) comprises the step (d1) of informing the master device corresponding to the identifier of the data transfer start.

5. The data transfer method of claim 4, wherein:

the step (f) comprises the step of (f1) receiving a transfer control packet containing a data transfer finish indicator and an identifier of a corresponding master device, and the step (g) comprises the step of (g1) informing the master device corresponding to the identifier of the data transfer finish.

6. A data transfer method comprising the steps of:

(a) receiving bus requests from two or more master devices and arbitrating access to an address/control bus according to a predetermined arbitration algorithm;

(b) receiving an access command packet containing information for data transfer preparation from the master device through the address/control bus in the order determined as a result of the arbitration and transmitting the received access command packet to a corresponding slave device;

(c) receiving notification of transfer preparation completion of corresponding data from the slave device;

(d) informing the master device of the start of data transfer; and (e) transferring data through the data bus, wherein the access command packet includes an address, a read/write flag, a bit width, and an identifier of a master device transmitting the access command packet.

7. The data transfer method of claim 5, wherein the access command packet further includes a burst length for burst transmission of data.

8. A data transfer method comprising the steps of:

(a) receiving bus requests from two or more master devices and arbitrating access to an address/control bus according to a predetermined arbitration algorithm;

(b) receiving an access command packet containing information for data transfer preparation from the master device through the address/control bus in the order determined as a result of the arbitration and transmitting the received access command packet to a corresponding slave device;

(c) receiving notification of transfer preparation completion of corresponding data from the slave device;

(d) informing the master device of the start of data transfer; and (e) transferring data through the data bus, wherein if data transfer in the step (e) aborts, the data transfer method further comprises the steps of:

(h) receiving an abort indicator from the slave device;

(i) informing a corresponding master device of the abort of data transmission; and (j) retransmitting the data.

9. The data transfer method of claim 8, wherein:

the step (h) comprises the step of (h') receiving the abort indicator and an identifier of a corresponding master device from the slave device, and the step (i) comprises the step of (i') transmitting the abort indicator to the master device corresponding to the identifier.

10. A bus system including an address/control bus and a data bus, the bus system comprising:

an arbiter for arbitrating access to the address/control bus according to a predetermined arbitration algorithm;

one or more master devices which transmits, to the arbiter, an access command packet containing information for data transfer preparation through the address/control bus in an order determined as a result of the arbitration, and which receives or transmits data through the data bus upon receipt of a notice of data transfer start from the arbiter; and one or more slave devices which informs the arbiter of data transfer preparation completion, which receives and executes the access command packet, and which receives data from, or transmits data to, a corresponding master device through the data bus upon receipt of a notice of data transfer start from the arbiter.

11. The bus system of claim 10, wherein, upon receipt of a data transfer finish indicator from the slave device, the arbiter informs the master device of the finish of data transfer.

12. The bus system of claim 11, wherein the arbiter receives the data transfer finish indicator from the slave device.

13. A bus system including an address/control bus and a data bus, the bus system comprising:

an arbiter for arbitrating access to the address/control bus according to a predetermined arbitration algorithm;

one or more master devices which transmits an access command packet containing information for data transfer preparation through the address/control bus in an order determined as a result of the arbitration, and which receives or transmits data through the data bus upon receipt of a notice of data transfer start from the arbiter; and one or more slave devices which informs the arbiter of data transfer preparation completion, which receives and executes the access command packet, and which receives data from, or transmits data to, a corresponding master device through the data bus upon receipt of a notice of data transfer start from the arbiter, wherein, upon receipt of a data transfer finish indicator from the slave device, the arbiter informs the master device of the finish of data transfer, and wherein the slave device transmits a transfer control packet containing a data transfer start indicator and an identifier of a corresponding device for informing about data transfer preparation completion, and the arbiter informs the master device, corresponding to the identifier contained in the transfer control packet, of the start of data transfer.

14. The bus system of claim 13, wherein the slave device transmits a transfer control packet containing a data transfer finish indicator and an identifier of a corresponding master device, if the data transfer is complete.

15. A bus system including an address/control bus and a data bus, the bus system comprising:

an arbiter for arbitrating access to the address/control bus according to a predetermined arbitration algorithm;

one or more master devices which transmits an access command packet containing information for data transfer preparation through the address/control bus in an order determined as a result of the arbitration, and which receives or transmits data through the data bus upon receipt of a notice of data transfer start from the arbiter; and one or more slave devices which informs the arbiter of data transfer preparation completion, which receives and executes the access command packet, and which receives data from, or transmits data to, a corresponding master device through the data bus upon receipt of a notice of data transfer start from the arbiter, wherein the access command packet includes an address, a read/write flag, a bit width, and an identifier of a master device transmitting the access command packet.

16. The bus system of claim 15, wherein the access command packet further includes a burst length for burst transmission of data.

17. A bus system including an address/control bus and a data bus, the bus system comprising:

an arbiter for arbitrating access to the address/control bus according to a predetermined arbitration algorithm;

one or more master devices which transmits an access command packet containing information for data transfer preparation through the address/control bus in an order determined as a result of the arbitration, and which receives or transmits data through the data bus upon receipt of a notice of data transfer start from the arbiter; and one or more slave devices which informs the arbiter of data transfer preparation completion, which receives and executes the access command packet, and which receives data from, or transmits data to, a corresponding master device through the data bus upon receipt of a notice of data transfer start from the arbiter, wherein if data transfer aborts, the slave device transmits a transfer control packet containing the abort indicator and an identifier of a corresponding master device to the arbiter, and the arbiter transmits an abort indicator to the master device corresponding to the identifier contained in the transfer control packet.

* * * * *